United States Patent [19]

Sleppy et al.

[11] Patent Number: 5,209,838
[45] Date of Patent: May 11, 1993

[54] PURIFICATION OF AN OIL-CONTAINING LIQUID USING A SURFACE TREATED PERMEABLE INORGANIC MEMBRANE

[75] Inventors: William C. Sleppy, New Kensington; Larry F. Wieserman, Apollo; Kenneth M. Thomas, Mars; Kenneth P. Goodboy, Wexford, all of Pa.

[73] Assignee: Aluminum Company of America, Pittsburgh, Pa.

[21] Appl. No.: 772,205

[22] Filed: Oct. 7, 1991

[51] Int. Cl.$^5$ .................. C10M 175/00; C10G 33/06; B01D 61/00

[52] U.S. Cl. .................. 208/179; 208/187; 210/649; 210/650; 210/651; 210/799

[58] Field of Search ............... 208/179, 187; 210/641, 210/649, 650, 651, 777, 799

[56] References Cited

U.S. PATENT DOCUMENTS 4,788,176 11/1988 Wieserman et al. ............... 502/401
4,957,890 9/1990 Wieserman et al. .................. 502/4
4,962,073 10/1990 Martin et al. .......................... 502/4

Primary Examiner—Theodore Morris
Assistant Examiner—Walter D. Griffin
Attorney, Agent, or Firm—Andrew Alexander; Glenn E. Klepac

[57] ABSTRACT

A process is described for purifying an oil-containing liquid to remove aqueous and solid impurities which comprises passing said liquid through a permeable inorganic membrane previously treated by contacting the membrane with an organic reactant selected from the group consisting of a phosphonic acid, a phosphinic acid, a monocarboxylic acid, a dicarboxylic acid, a boronic acid, a phosphoric acid ester and a precursor which decomposes upon contact with said inorganic membrane to form one of said organic reactants whereby the treated membrane is capable of separating aqueous and solid impurities from hydrocarbons in the oil-containing liquid.

31 Claims, 1 Drawing Sheet

TREATING A PERMEABLE INORGANIC MEMBRANE WITH AN ORGANIC ACID REACTANT SELECTED FROM PHOSPHONIC ACID, PHOSPHINIC ACID, MONOCARBOXYLIC ACID, DICARBOXYLIC ACID, BORONIC ACID, PHOSPHORIC ACID ESTER, OR A PRECURSOR OF ANY OF SAME

↓

FLOWING AN OIL-CONTAINING LIQUID THROUGH THE TREATED MEMBRANE TO REMOVE AQUEOUS AND SOLID IMPURITIES

↓

RECOVERING A PURIFIED OIL SUBSTANTIALLY FREE OF WATER AND SOLIDS

PURIFICATION OF AN OIL-CONTAINING LIQUID USING A SURFACE TREATED PERMEABLE INORGANIC MEMBRANE

BACKGROUND OF THE INVENTION

1. Field of the Invention

This invention relates to a process for the purification of hydrocarbons containing impurities. More particularly, this invention relates to a process for purifying hydrocarbons containing solid and liquid impurities by filtration through an inorganic membrane treated to permit selective permeability of hydrocarbons or aqueous liquids therethrough.

2. Description of the Related Art

In a highly industrialized society such as in the United States, virtually every type of industry uses oil of one kind or another. However, oil is no longer an inexpensive commodity. Therefore, production of crude oil from marginal wells has become a more common practice in recent years. Such recovery of oil from marginal wells often employs water flooding or steam flooding techniques wherein at least a part of the recovered oil contains solid impurities, as well as aqueous impurities. Sometimes, with mechanical processes and/or with addition of chemicals, emulsions are formed between the aqueous liquid impurities, such as water, and the oil, which further complicates the separation and removal of such liquid and solid impurities from the oil.

Furthermore, such marginal crude oils often require desalting to minimize fouling caused by deposition of salts on heat transfer surfaces and corrosion caused by heavy metal compounds, which are typically present in such crude oils. Such desalting is usually carried out by emulsifying fresh water with the crude oil at about 250° F. under sufficient pressure to prevent vaporization. The salts dissolve in the water and the oil/water separation is carried out using chemicals and/or using a high potential electric field across a settling vessel to aid in coalescence of the oil droplets. In theory, this works well but in many cases, it is very difficult to break the emulsion. This drastically drives up the cost of desalting. With good chemical emulsifier control, the crude oil contains only about 0.2% water, but if the water content rises, it can cause major problems in the crude distillation tower and other processing units downstream.

There, therefore, exists a need for an economical process, either for use by itself or in combination with other purification processes such as desalting, for the recovery of the crude oil values from the mixtures reclaimed from such marginal wells.

However, in addition to the reclamation and purification of crude oil values from impure crude oil-containing liquids recovered from marginal oil wells, and on the sludge from oil production, there exists a need for the economical purification and recycling of oil values from used oil-containing products such as motor oil and other lubricating oils, water-based coolants, synthetic hydraulic fluids and hydraulic oils (hydrocarbons), automatic transmission fluids, ester-based liquids, cutting oils, drawing oils, quenching oils and gear box oils. The need for reclamation of the oil values from such materials has become important both because of economics, as well as because of environmental concerns regarding the disposal of such materials. Therefore, the cleaning and reclaiming of oil values from such systems, where the oil has become contaminated, is an important modern process. The purification of refined hydrocarbons, e.g., fuels such as gasoline, diesel fuel, jet fuel and home heating oils, to remove water therefrom, is also important.

The use of membranes in the filtration/purification of materials has become an important technology. Organic polymers have been employed in the formation of such membranes and the use of inorganic membranes made from metals, glass and metal oxides is well known.

While the use of membrane filtration has become an important technology for separation and/or purification of materials as a whole, it has not enjoyed the same amount of interest in the field of purification and recovery of oil-containing values from impure liquids such as impure crude or refined oils or reclamation of waste oil products.

This is due, in part, to the limitation of organic polymer membranes, when oil-based materials clog such membranes. Subsequent attempts to clean such organic membranes using aggressive chemicals, particularly acids and/or bases, and/or solvents, can result in damage or destruction of the organic membrane material. Also, for many petrochemical processes, membranes must operate in environments of high temperature, pressure and organic solvents which rapidly degrade the performance of such organic membrane.

While the use of inorganic materials as membrane filter/separation media would solve the problem of the use of aggressive chemicals to clean the membrane to remove materials fouling the membrane, such inorganic materials are typically hydrophilic and preferentially pass water while rejecting oils and solids and, therefore, tend to be poor separators of the oil (organic) and aqueous phases usually present in such impure mixtures.

It would, therefore, be highly desirable to provide a process which would permit the economical recovery of oil values from either impure crude oil or spent (waste) oil-based materials, and/or the separation of aqueous impurities from oil values.

SUMMARY OF THE INVENTION

It is, therefore, an object of this invention to provide an economical process for the recovery of oil values from an impure mixture containing such oil values comprising a filtration process which utilizes an inorganic membrane which has been treated to facilitate the separation of oil-based materials from solids and aqueous liquid materials.

It is another object of this invention to provide an economical process for the recovery of oil values from an impure mixture containing such oil values comprising a filtration process which utilizes an inorganic membrane which has been treated to facilitate the separation of oil-based materials from aqueous materials by changing the wetting properties of the membrane to form either a hydrophobic or hydrophilic layer thereon; making the surface more uniformly hydrophobic or hydrophilic in character; providing chemical stability to high or low pH media; controlling the pore size when microporous membrane material is used; or any combination of the above.

It is yet another object of this invention to provide a filtration process that utilizes both hydrophilic and hydrophobic membranes in staged operations to purify both aqueous and hydrocarbon streams in an oil/- water/solids mixture/emulsion, thus minimizing waste streams.

It is still another object of this invention to provide an economical process for the recovery of oil values from an impure mixture containing such oil values comprising a filtration process which utilizes an inorganic membrane which has been treated to facilitate the separation of oil-based materials from aqueous materials by the treatment of the inorganic membrane with a material selected from the group consisting of a phosphonic acid, a phosphinic acid, a carboxylic acid, a boronic acid, and a phosphoric acid ester.

It is a further object of this invention to provide an economical process for the recovery of oil values from an impure mixture containing such oil values comprising a filtration process which utilizes an inorganic membrane which has been treated to facilitate the separation of oil-based materials from aqueous materials by the formation of a monomolecular layer on the surface of the inorganic membrane by the treatment of the inorganic membrane with a material selected from the group consisting of a phosphonic acid, a phosphinic acid, a carboxylic acid, a boronic acid and a phosphoric acid ester to form a monomolecular layer of a material which also is a chemically stable material capable of withstanding treatment of the inorganic membrane with chemicals capable of removing materials tending to clog the membrane.

These and other objects of the invention will become apparent from the following description and accompanying flow sheet.

BRIEF DESCRIPTION OF THE DRAWING

The sole drawing is a flowsheet illustrating the process of the invention.

DETAILED DESCRIPTION OF THE INVENTION

The invention comprises a process for purifying waste streams, including the recovery of oil values from an impure mixture of materials containing such oil values, as well as solid and/or aqueous liquid impurities, using a treated inorganic membrane which is capable of withstanding exposure to high temperature and high pressure. The inorganic membrane is treated to (a) improve its chemical stability over a wide range of pH so that chemicals of high or low pH may be used to treat the membrane to remove materials tending to clog the membrane; (b) render the surface more uniformly hydrophobic (or hydrophilic) in character; and where needed, (c) render a hydrophilic membrane hydrophobic (or vice versa). When the permeable membrane is microporous, i.e., has a pore size of 200 Å or less, the treatment may also be used to control pore size.

The inorganic membrane used in the recovery of the oil values from the impure oil-containing mixture comprises a membrane which is capable of being treated with certain organic acids or organic acid esters. The membrane may be formed from a metal, a ceramic, a ceramic-coated metal or a metal-coated ceramic.

The metal from which such a membrane may be formed (whether used by itself, as a coating for a ceramic membrane or as the substrate beneath a ceramic coated membrane) may be selected from the group consisting of Groups IIIa (Sc and Y), IVa (Ti, Zr and Hf), V (V, Nb and Ta), VIa (Cr, Mo and W), VIIa (Mn, Tc and Re), VIII (Fe, Ru, Os, Co, Rh, Ir, Ni, Pd and Pt), Ib (Cu, Ag and Au), IIb (Zn, Cd and Hg), IIIb (B, Al, Ga, In and Tl), IVb (Ge, Sn and Pb), Vb (As, Sb and Bi), elements in the lanthanide series and the actinide series, mixtures thereof, and mixtures of Groups IIa (Be, Mg, Ca, Sr and Ba) and VIb (Se and Te).

Of the above metals, Ti, Ta, W, Al, Sn, Zn, Co, Zr, Fe, Cr-Ni-Fe stainless steel alloys, Ni, Cr, Cu and the precious metals Ru, Os, Rh, Ir, Pd, Pt, Ag and Au are particularly preferred.

The ceramic from which such a membrane may be formed (whether used by itself, as a coating for a metal membrane or as the substrate beneath a metal-coated membrane) may be selected from the group consisting of any oxide, sulfide, boride, carbide or nitride of any of the above metals.

When the ceramic comprises a metal oxide, aluminum oxide, iron oxide, titanium oxide, zirconium oxide, and zeolites are particularly preferred. In an especially preferred embodiment, the ceramic material used in the formation of the permeable inorganic membrane to be treated comprises aluminum oxide or zirconium oxide.

Alpha alumina is the preferred material for high strength large pore diameter membranes. The alpha alumina membrane may be surfaced (coated), for example, with other forms of alumina (Gamma, Delta, Eta, Chi, Kappa, Theta, Rho, etc.), aluminum hydroxide, zirconia, titania, or one of the above metals to change the grain size or pore size of the resulting membrane.

The term "metal oxide" as used herein is intended to define a broad spectrum of oxides of a particular metal ranging from those which may contain few hydroxides, e.g., activated forms of aluminum oxide (alumina), to more hydrated (hydroxy) forms which may comprise mainly trihydroxide, e.g., $Al(OH)_3$. It has been found, however, that metal oxide forms in which hydroxides are also present in significant quantities, rather than metal oxides with few, if any, hydroxides, provide a better bond with the organic reactant with which it is reacted.

However, for certain applications, dehydrated or activated forms of the metal oxide may be preferred due to the higher surface area of such materials. For example, when aluminum oxide is used, the hydrated or hydroxy forms will be preferred, e.g., gibbsite, bayerite or boehmite, when a large external surface area is desired; while activated alumina will be preferred when it is desirous that the metal oxide have a high internal surface area. Thus, the metal oxide forms of the permeable inorganic membrane useful in the practice of this invention may also be properly referred to as a "metal oxide/hydroxide", and this term is intended to mean the same as the term "metal oxide" for purposes of this invention.

The pore diameters of the permeable inorganic membrane, prior to treatment in accordance with the invention, may range from about 5 Å to about 1000 microns, preferably about 40 Å to about 1000 microns, preferably from about 35 Å up to about 15 microns.

It should be noted that while the porosity of the membrane materials has been discussed with regard to pore diameter, measurement of the porosity is sometimes referred to as the pore volume due to the nature of the nitrogen absorption measurement technique.

The permeable inorganic membrane may be treated by contacting it with an organic material selected from the group consisting of phosphonic acid having the formula $RPO(OH)_2$, phosphinic acid having the formula $RR'PO(OH)$, mono and dicarboxylic acids having the formula $R''(COOH)_{1-2}$, boronic acid having the formula $RB(OH)_2$, phosphoric acid esters and diesters having the respective formulas $(RO)PO(OH)_2$ and $(RO)(R'O)PO(OH)$, and precursors of such acids and acid esters which decompose upon contact with the membrane to form the acid or acid ester functionality, where R, may be hydrogen, both R and R' may each be comprised of 1-30, preferably 5-30, carbon-containing groups such as an alkyl group, and R" may be a 2-30 carbon-containing group.

Such treatment will normally render the surface of the above-described membrane hydrophobic. However, it is also possible to use the above treatment to render the surface of the treated membrane hydrophilic, instead of hydrophobic by substituting R groups on the treatment agent. To render the membrane surfaces hydrophilic, molecular structures having dipole moments and polarity will be components in R groups having 1-6 carbon atoms. Examples of molecular structures with dipoles are alcohols, acids, amines, esters, aldehydes, ketones and combinations thereof.

Thus, when the membranes are to be hydrophobic, the R and/or R' and/or R" groups may include long and short chain aliphatic hydrocarbons, aromatic hydrocarbons, ethers, alkenes, alkynes, nitriles, organosilicones, perfluoro organic groups, perchloro organic groups, perbromo organic groups and combinations of these groups. The organic acid molecules, such as listed above, may also include one or more halogen groups substituted thereon.

Preferably, for hydrophobic compounds, the groups which may comprise R and/or R' and/or R" include long and short chain aliphatic hydrocarbons, aromatic hydrocarbons, ethers, alkenes, alkynes, nitriles, organosilicones, perfluoro groups and combinations of these groups.

However, when the membranes are to be hydrophilic, the R and/or R' and/or R" groups may include aldehydes, ketones, amines, amides, thioamides, imides, lactams, anilines, pyridines, piperidines, carbohydrates, thiocyanates, esters, lactones, alcohols, nitriles, oximes, organosilicones, sulfur containing organic compounds, ureas, thioureas and combinations of these groups. The organic acid molecules, such as listed above, may also include one or more inorganic groups substituted thereon such as nitrates, phosphates, phosphinates, phosphinites, phosphonates, quaternary ammonium salts and the like.

Preferably, when the membranes are to be hydrophilic, the groups which may comprise R and/or R' and/or R" include amines, imides, anilines, pyridines, piperidines, carbohydrates, thiocyanates, alcohols, nitriles, organosilicones, sulfur containing organic groups and combinations of these groups.

Examples of organic acid reactants which may comprise precursors which may partially decompose upon contact with the permeable inorganic membrane to form the acid functionality capable of reacting with the inorganic membrane may include the anhydrides and acid halides.

The size of the R or R' group on the organic acid molecule may also be used to regulate or alter the pore size of the permeable inorganic membrane by, for example, increasing the length of the chain of the R group to decrease the pore size. In addition, it must be noted that the effective pore size may also be changed by the type of organic acid molecule without changing the physical size of the pore, such as, for example, when the hydrophobicity of the pore is changed.

Preferably, the permeable inorganic membrane is treated to form a monomolecular layer of such organic acid or organic acid ester material, with the excess not bonded to the inorganic membrane being removed from the surface prior to use.

Such treated permeable inorganic membranes are described in more detail in Wieserman et al U.S. Pat. No. 4,957,890 and Wieserman et al U.S. Pat. No. 4,962,073, each assigned to the assignee of this application, and cross-reference to each of which is hereby made.

Wieserman U.S. Pat. No. 4,957,890 describes the formation of surface treated inorganic permeable membranes comprising certain metals, metal oxides and/or metal hydroxides wherein the membranes are treated to enhance their chemical stability over a wide pH range by contacting the membrane with a solution containing certain phosphonic acids, phosphinic acids, monocarboxylic acids, dicarboxylic acids, boronic acids, or precursors of any of the above which decompose upon contact with the membrane to form the acid functionality. Preferably, a monomolecular layer of the acid functionality is formed over and bonded to the inorganic membrane.

Wieserman et al U.S. Pat. No. 4,962,073 describes the formation of surface treated inorganic membranes by treating an inorganic membrane similar to those described above with a phosphoric acid ester to provide a modified surface thereon also having the desired enhanced chemical stability as described above. As in Wieserman et al U.S. Pat. No. 4,957,890, preferably a monomolecular layer of the phosphoric acid ester functionality is formed over and bonded to the inorganic membrane.

The oil-containing liquid from which the oil values are to be extracted may comprise any oil-containing liquid containing aqueous impurities and which may or may not also contain solid impurities to be separated from the oil values. Such liquids, as previously discussed, may include impure crude oils, and used oil-containing products such as motor oil and other lubricating oils, water based coolants, synthetic hydraulic fluids and hydraulic oils (hydrocarbons), automatic transmission fluids, ester based liquids, cutting oils, drawing oils, quenching oils and gear box oils. The impure oil-containing liquid may also comprise a refined hydrocarbon from which water must be removed, e.g., removal of water from fuels such as gasoline, diesel fuel, jet fuel and home heating oils. Other oil-containing aqueous liquids which may be purified by the process of the invention include sludges, crude oil containing process or recovery water, tank bottoms, tar sands, natural gas condensates, water based lubricants, edible oils and even oil spills in bodies of water, e.g., oil spills in oceans, lakes or rivers.

The impure oil-containing liquid may have a water content, prior to treatment with the process of the invention, as high as 99 vol. % and may contain as much as 99 wt. % solids present as either total suspended solids or bottom sediments, with a combined total weight of solids and water as high as 99 wt. %. Typically, an impure oil-containing liquid having a water content of, for example, about 50 vol. %, will have a water content, after treatment in accordance with the process of the invention, below detection limits, i.e., less than 0.05 wt. %.

In accordance with the invention, the oil-containing liquid is pumped into a filter containing the previously described treated inorganic membrane at a pressure ranging from about 2 psig to about 1200 psig (although processing under a vacuum is possible).

The temperature of the liquid, at the pressure used, should range from just above the freezing point of the liquid to just below the boiling point of the liquid or the decomposition temperature of the organic acid/acid ester treatment material bonded to the surface of the inorganic membrane, whichever is lower. Usually the temperature will range from about 0° C. up to about 500° C.

It will, of course, be recognized that the use of such elevated temperatures will usually be avoided for economical reasons and will probably only be utilized when the oil-containing liquid has a very high viscosity. The viscosity of the liquid being purified, at the operating temperature, should preferably not exceed about 2000 centipoise.

The process may be carried out on a continuous basis, with periodic interruption of the process to purge the membrane of accumulated solids, which otherwise will tend to foul the membrane, resulting in a high back pressure and a lowering of the throughput rate. Such periodic interruption can include merely a backpulse, for example, every 2-3 minutes of less than about a second each time. Such purging may also comprise a physical purging or backflushing to remove accumulated solids and may be carried out as frequently as once an hour or once a day, as needed.

The purging may, however, also comprise a chemical purging to remove accumulated solids, such as waxes, which may not be physically removable and which may gradually build up and foul the permeable membrane. Such chemical purging should be done as needed at intervals which may range from about 0.1 to 100 days of continuous use.

This chemical purging may be accomplished by backflushing the filter with acid/base solutions; organic solvents or surfactants; chelating agents; or combinations of the same.

When acid/base solutions are used to chemically purge the membrane, the membrane may be rinsed with a solution of a mineral acid, such as HCl or $HNO_3$, followed by an alkaline solution such as NaOH, $NH_4OH$ or KOH to neutralize the membrane as well as to dissolve materials such as silicas not dissolved by the acid, and then rinsing the membrane with water. The acid/alkaline treatment steps may be reversed if desired.

The membrane may also be chemically purged using solvents or surfactants to remove organic deposits. Examples of such chemical purging materials include toluene, ketones such as MEK, alcohols, pentane, soaps, surfactants and detergents.

A chelating agent such as Scale-Solv XFE® or EDTA, commercially available chelating agents, may also be used to selectively remove certain mineral deposits.

It should be noted that when such cleaning is carried out, it may be desired to retreat the membrane in the field with the treatment of the invention, and such retreatment should be deemed to be within the scope of the invention.

The process may utilize more than one membrane in staged sequence, wherein one membrane has a hydrophobic surface, while another membrane has a hydrophilic surface. For example, when attempting to purify oil water, i.e., water containing typically less than 1% oil, a hydrophilic membrane may be used in a first stage. The concentrate or a blowdown from the first stage then goes to a second stage (or even a third stage) hydrophobic membrane from which the oil product will be recovered.

In contrast, when attempting to purify a liquid comprising a 50/50 vol. % mixture of water and hydrocarbons, the impure liquid could be first passed through a hydrophobic treated membrane which will pass the hydrocarbons, while excluding most of the water and solids. Then, the hydrocarbon liquid from the first stage, which may still contain 1-2 vol. % water, can be passed through a hydrophilic membrane which will permit the water to pass through. Using the hydrophobic membrane in the first filtration step would permit exclusion of both water and unwanted solids, while the use of a hydrophilic membrane in the second stage accelerates the filtration at this stage since only the small amount of water, e.g., 1-2 vol. %, need pass through the membrane rather than the much larger amount of hydrocarbon, e.g., 98 vol. %.

To further illustrate the practice of the process of the invention, a very viscous highly emulsified, high solids oily waste sludge was purified by passing it through a 500 Å pore size zirconium membrane previously treated with octadecyl phosphonic acid, a 500 Å pore size zirconium membrane treated with phenyl phosphonic acid, a 0.8 micron pore size alpha alumina membrane treated with octadecyl phosphonic acid, and a 0.8 micron pore size alpha alumina membrane treated with phenyl phosphonic acid. The sludge to be treated had a total solids content of 4-7 wt. % and bottom settlings (base sediment) and water (BSW) content of about 40-50 wt. %. The permeate recovered from the filtration, in each case, was a high quality crude oil containing no detectable solids and less than 0.05 wt. % water.

Thus, the invention provides a process for the recovery of oil values from oil-containing impure aqueous liquids which may also contain solid impurities, whereby the recovered oil is free of detectable amounts of solids and contains less than 0.05 wt. % water.

Having thus described the invention, what is claimed is:

1. A process for purifying an oil-containing liquid to remove aqueous and solid impurities which comprises:
   (a) maintaining an oil-containing liquid within a temperature range of from just above the freezing point of the liquid to just below its boiling point;
   (b) passing said liquid through a permeable inorganic membrane comprising a metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, elements in the lanthanide series and the actinide series, mixtures thereof, mixtures of Groups IIa (Be, Mg, Ca, Sr and Ba) and VIb (Se and Te), and a ceramic selected from the group consisting of an oxide, sulfide, boride, carbide, or nitride of one or more of said metals which has been previously treated by contacting the membrane with an organic reactant selected from the group consisting of a phosphonic acid, a phosphinic acid, a monocarboxylic acid, a dicarboxylic acid, a boronic acid, a phosphoric acid ester and a precursor which decomposes upon contact with said inorganic membrane to from one of said organic reactants to form a layer of said organic reactant thereon; and (c) maintaining a pressure on said oil-containing liquid within a range of form about 2 psig to about 1200 psig as said liquid passes through said treated inorganic membrane.

2. The process of claim 1 wherein said permeable inorganic membrane has been treated to form a hydrophobic layer of said organic reactant thereon.

3. The process of claim 1 wherein said permeable inorganic membrane has been treated to form a monomolecular layer of said organic reactant thereon.

4. The process of claim 3 wherein said treated permeable inorganic membrane has a pore size, after treatment, within a range of from about 35 Å up to about 15 microns.

5. The process of claim 3 wherein said oil-containing liquid is maintained within a temperature range of from about 0° C. to about 500° C. as it is passed through said treated inorganic membrane.

6. The process of claim 3 which includes the further steps of:
(d) interrupting said passing of said oil-containing liquid through said treated membrane; and
(e) physically purging said treated membrane to remove solids from said membrane.

7. The process of claim 6 wherein said step of physically purging said treated membrane to remove solids further comprises backflushing said treated membrane.

8. The process of claim 3 which includes the further steps of:
(d) interrupting said passing of said oil-containing liquid through said treated membrane; and
(e) physically purging said treated membrane to remove organic deposits from said membrane.

9. The process of claim 3 which includes the further steps of:
(d) interrupting said passing of said oil-containing liquid through said treated membrane; and
(e) contacting said treated membrane with one or more chemicals capable of removing solids from said membrane.

10. The process of claim 1 which further comprises contacting said treated membrane with one or more chemicals selected from the group consisting of one or more acids, one or more bases, one or more organic solvents or surfactants, one or more chelating agents, and mixtures of the same.

11. The process of claim 9 wherein said step of contacting said treated membrane with one or more chemicals capable of removing solids from said membrane further comprises contacting said treated membrane with an acidic or basic chemical having a pH ranging from 1 to 14.

12. The process of claim 3 wherein said treated permeable inorganic membrane comprises a permeable material selected from the group consisting of a metal, a ceramic, a metal coated ceramic and a ceramic coated metal.

13. The process of claim 12 wherein said metal, metal coated ceramic, or ceramic coated metal comprises a metal selected from the group consisting of Sc, Y, Ti, Zr, Hf, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, elements in the lanthanide series and the actinide series, mixtures thereof, and mixtures of Groups IIa (Be, Mg, Ca, Sr and Ba) and VIb (Se and Te).

14. The process of claim 12 wherein said ceramic, metal coated ceramic, or ceramic coated metal comprises a ceramic selected from the group consisting of an oxide, sulfide, boride, carbide, or nitride of a metal selected from the group consisting of Sc, Y, Ti, Zr, Hf, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, elements in the lanthanide series and the actinide series, mixtures thereof, and mixtures of Groups IIa (Be, Mg, Ca, Sr and Ba) and VIb (Se and Te).

15. The process of claim 12 wherein said treated permeable inorganic membrane comprises a metal inorganic membrane material selected from the group consisting of Ti, Ta, W, Al, Sn, Zn, Co, Zr, Fe, Cr-Ni-Fe stainless steel alloys, Ni, Cr, Ru, Os, Rh, Ir, Pd, Pt, Ag and Au.

16. The process of claim 12 wherein said treated permeable inorganic membrane comprises a metal oxide/hydroxide inorganic membrane material selected from the group consisting of aluminum oxide, iron oxide, titanium oxide, zirconium oxide and a zeolite.

17. The process of claim 16 wherein said treated permeable inorganic membrane comprises a metal oxide/hydroxide inorganic membrane material selected from the group consisting of aluminum oxide and zirconium oxide.

18. The process of claim 3 wherein said treated permeable inorganic membrane has been treated with one or more phosphonic acids having the formula RPO(OH)$_2$, where R may comprise a 1-30 carbon-containing group selected from the group consisting of aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, ureas, thioureas, perfluoro organic groups, perchloro organic groups, perbromo organic groups and combinations of these groups.

19. The process of claim 18 wherein said phosphonic acid molecule may also include one or more inorganic groups substituted thereon selected from the group consisting of halogens, nitrates, phosphates, phosphinates, phosphinites, phosphonates and quaternary ammonium salts.

20. The process of claim 3 wherein said treated permeable inorganic membrane has been treated with one or more phosphinic acids having the formula RR'PO(OH), where R' may be hydrogen and both R and R' may each be comprised of a 1-30 carbon-containing group selected from the group consisting of aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, ureas, thioureas, perfluoro organic groups, perchloro organic groups, perbromo organic groups and combinations of these groups.

21. The process of claim 20 wherein said phosphinic acid molecule may also include one or more inorganic groups substituted thereon selected from the group consisting of halogens, nitrates, phosphates, phosphinates, phosphinites, phosphonates and quaternary ammonium salts.

22. The process of claim 3 wherein said treated permeable inorganic membrane has been treated with one or more carboxylic acids selected from the group consisting of:

(a) one or more monocarboxylic acids having the formula R"(COOH);
(b) one or more dicarboxylic acids having the formula R"(COOH)$_2$; and
(c) mixtures of the same;

where R" may comprise a 2-30 carbon-containing group selected from the group consisting of aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, ureas, thioureas, perfluoro organic groups, perchloro organic groups, perbromo organic groups and combinations of these groups.

23. The process of claim 22 wherein said carboxylic acid molecule may also include one or more inorganic groups substituted thereon selected from the group consisting of halogens, nitrates, phosphates, phosphinates, phosphinites, phosphonates and quaternary ammonium salts.

24. The process of claim 3 wherein said treated permeable inorganic membrane has been treated with one or more boronic acids having the formula RB(OH)$_2$, where R may comprise a 1-30 carbon-containing group selected from the group consisting of aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, ureas, thioureas, perfluoro organic groups, perchloro organic groups, perbromo organic groups and combinations of these groups.

25. The process of claim 24 wherein said boronic acid molecule may also include one or more inorganic groups substituted thereon selected from the group consisting of halogens, nitrates, phosphates, phosphinates, phosphinites, phosphonates and quaternary ammonium salts.

26. The process of claim 3 wherein said treated permeable inorganic membrane has been treated with a phosphoric acid ester selected from the group consisting of:
(a) one or more phosphoric acid esters having the formula (RO)PO(OH)$_2$;
(b) one or more phosphoric acid diesters having the formula (RO)(R'O)PO(OH); and
(c) mixtures of the same;

where R or R' may each comprise a 1-30 carbon-containing group selected from the group consisting of aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, ureas, thioureas, perfluoro organic groups, perchloro organic groups, perbromo organic groups and combinations of these groups.

27. The process of claim 26 wherein said phosphoric acid ester molecule may also include one or more inorganic groups substituted thereon selected from the group consisting of halogens, nitrates, phosphates, phosphinates, phosphinites, phosphonates and quaternary ammonium salts.

28. A process for purifying an oil-containing liquid to remove aqueous and solid impurities which comprises:
(a) heating said oil-containing liquid to a temperature range of from about 0° C. to about 500° C. and maintaining said liquid within said temperature range during said process;
(b) passing said liquid through an inorganic membrane comprising aluminum oxide or zirconium oxide, said membrane having been previously treated by contact with an organic reactant selected from the group consisting of a phosphonic acid, a phosphinic acid, a monocarboxylic acid, a dicarboxylic acid, a boronic acid, a phosphoric acid ester, and a precursor which decomposes upon contact with said inorganic membrane to form one of said organic reactants to form a monomolecular layer of said organic reactant thereon whereby said treated inorganic membrane has a pore size, after treatment, within a range of from about 5 Å to about 1000 microns; and
(c) maintaining a pressure on said oil-containing liquid within a range of from about 2 psig to about 1200 psig as said liquid passes through said treated inorganic membrane.

29. The process of claim 28 which includes the further steps of:
(a) interrupting said passing of said oil-containing liquid through said treated membrane; and
(b) physically purging said treated membrane to remove solids from said membrane.

30. The process of claim 28 which includes the further step of:
(a) interrupting said passing of said oil-containing liquid through said treated membrane; and
(b) contacting said treated membrane with one or more chemicals capable of removing solids from said membrane.

31. A process for purifying an oil-containing liquid to remove aqueous and solid impurities which comprises:
(a) heating said oil-containing liquid to a temperature range of from about 0° C. to about 500° C. and maintaining said liquid within said temperature range during said process;
(b) passing said liquid through a permeable inorganic membrane comprising a metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, elements in the lanthanide series and the actinide series, mixtures thereof, mixtures of Groups IIa (Be, Mg, Ca, Sr and Ba) and VIb (Se and Te), and a ceramic selected from the group consisting of an oxide, sulfide, boride, carbide, or nitride of one or more of said metals, said membrane having been previously treated by contact with an organic reactant selected from the group consisting of a phosphonic acid, a phosphinic acid, a monocarboxylic acid, a dicarboxylic acid, a boronic acid, a phosphoric acid ester and a precursor which decomposes upon contact with said inorganic membrane to form a monomolecular layer of said organic reactant thereon, said inorganic membrane having a pore size of about 5 Å to 1000 microns;
(c) maintaining a pressure on said oil-containing liquid within a range of from about 2 psig to about 1200 psig as said liquid passes through said treated inorganic membrane;
(d) interrupting said passing of said oil-containing liquid through said treated membrane; and
(e) removing solids from said membrane.

* * * * *